US008484529B2

(12) United States Patent
Alves et al.

(10) Patent No.: US 8,484,529 B2
(45) Date of Patent: Jul. 9, 2013

(54) ERROR CORRECTION AND DETECTION IN A REDUNDANT MEMORY SYSTEM

(75) Inventors: Luiz C. Alves, Hopewell Junction, NY (US); Kevin C. Gower, LaGrangeville, NY (US); Lisa C. Gower, legal representative, LaGrangeville, NY (US); Luis A. Lastras-Montano, Cortlandt Manor, NY (US); Patrick J. Meaney, Poughkeepsie, NY (US); Eldee Stephens, Waterbury, CT (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/822,503

(22) Filed: Jun. 24, 2010

(65) Prior Publication Data
US 2011/0320914 A1    Dec. 29, 2011

(51) Int. Cl.
*G06F 11/00* (2006.01)
(52) U.S. Cl.
USPC .......................................... 714/758; 714/718
(58) Field of Classification Search
USPC .................. 714/758, 759, 763, 764, 766, 718
See application file for complete search history.

(56) References Cited

U.S. PATENT DOCUMENTS

| 4,464,747 | A | | 8/1984 | Groudan et al. |
| 5,124,948 | A | | 6/1992 | Takizawa et al. |
| 5,163,023 | A | | 11/1992 | Ferris et al. |
| 5,272,671 | A | | 12/1993 | Kudo |
| 5,463,643 | A | | 10/1995 | Gaskins |
| 5,488,691 | A | | 1/1996 | Fuoco |
| 5,499,253 | A | | 3/1996 | Lary |
| 5,513,135 | A | | 4/1996 | Dell et al. |
| 5,537,665 | A | | 7/1996 | Patel et al. |
| 5,655,076 | A | | 8/1997 | Kimura et al. |
| 5,680,564 | A | * | 10/1997 | Divivier et al. ............. 712/205 |
| 5,684,810 | A | | 11/1997 | Nakamura et al. |
| 6,012,839 | A | * | 1/2000 | Nguyen et al. ............. 714/755 |
| 6,125,469 | A | | 9/2000 | Zook et al. |
| 6,131,178 | A | | 10/2000 | Fujita et al. |
| 6,332,206 | B1 | * | 12/2001 | Nakatsuji et al. ............. 714/755 |
| 6,381,685 | B2 | | 4/2002 | Dell et al. |
| 6,418,068 | B1 | | 7/2002 | Raynham |

(Continued)

FOREIGN PATENT DOCUMENTS

| JP | 11144491 A2 | 5/1999 |
| WO | 2006029243 A1 | 3/2006 |

OTHER PUBLICATIONS

The RAIDBook—A Source Book for RAID Technology by the RAID Advisory Board, Lino Lakes, MN; Jun. 9, 1993; XP002928115.

(Continued)

*Primary Examiner* — Dieu-Minh Le
(74) *Attorney, Agent, or Firm* — Cantor Colburn LLP

(57) ABSTRACT

Error correction and detection in a redundant memory system that includes a memory controller; a plurality of memory channels in communication with the memory controller, the memory channels including a plurality of memory devices; a cyclical redundancy code (CRC) mechanism for detecting that one of the memory channels has failed, and for marking the memory channel as a failing memory channel; and an error correction code (ECC) mechanism. The ECC is configured for ignoring the marked memory channel and for detecting and correcting additional memory device failures on memory devices located on one or more of the other memory channels, thereby allowing the memory system to continue to run unimpaired in the presence of the memory channel failure.

20 Claims, 6 Drawing Sheets

U.S. PATENT DOCUMENTS

| | | | |
|---|---|---|---|
| 6,442,726 B1 * | 8/2002 | Knefel | 714/763 |
| 6,715,116 B2 * | 3/2004 | Lester et al. | 714/718 |
| 6,763,444 B2 | 7/2004 | Thomann | |
| 6,820,072 B1 | 11/2004 | Skaanning et al. | |
| 6,845,472 B2 | 1/2005 | Walker | |
| 6,845,474 B2 | 1/2005 | Circenis et al. | |
| 6,854,070 B2 | 2/2005 | Johnson et al. | |
| 6,973,612 B1 | 12/2005 | Rodi | |
| 6,976,194 B2 | 12/2005 | Cypher | |
| 6,981,205 B2 | 12/2005 | Fukushima et al. | |
| 6,988,219 B2 | 1/2006 | Hitz et al. | |
| 7,055,054 B2 | 5/2006 | Olarig | |
| 7,099,994 B2 | 8/2006 | Thayer et al. | |
| 7,149,945 B2 | 12/2006 | Brueggen | |
| 7,191,257 B2 | 3/2007 | Ali Khan et al. | |
| 7,200,780 B2 | 4/2007 | Kushida | |
| 7,278,086 B2 | 10/2007 | Banks et al. | |
| 7,313,749 B2 | 12/2007 | Nerl et al. | |
| 7,320,086 B2 | 1/2008 | Majni et al. | |
| 7,353,316 B2 | 4/2008 | Erdmann | |
| 7,409,581 B2 | 8/2008 | Santeler et al. | |
| 7,467,126 B2 | 12/2008 | Smith et al. | |
| 7,484,138 B2 | 1/2009 | Hsieh et al. | |
| 7,752,490 B2 | 7/2010 | Abe | |
| 8,041,990 B2 | 10/2011 | O'Connor et al. | |
| 8,046,628 B2 | 10/2011 | Resnick | |
| 2003/0002358 A1 | 1/2003 | Lee et al. | |
| 2003/0023930 A1 | 1/2003 | Fujiwara et al. | |
| 2003/0208704 A1 | 11/2003 | Bartels et al. | |
| 2004/0034818 A1 | 2/2004 | Gross et al. | |
| 2004/0093472 A1 | 5/2004 | Dahlen et al. | |
| 2004/0123223 A1 | 6/2004 | Halford | |
| 2004/0168101 A1 | 8/2004 | Kubo | |
| 2005/0108594 A1 | 5/2005 | Menon et al. | |
| 2005/0204264 A1 | 9/2005 | Yusa | |
| 2006/0156190 A1 | 7/2006 | Finkelstein et al. | |
| 2006/0244827 A1 | 11/2006 | Moya | |
| 2006/0248406 A1 | 11/2006 | Qing et al. | |
| 2006/0282745 A1 | 12/2006 | Joseph et al. | |
| 2007/0011562 A1 | 1/2007 | Alexander et al. | |
| 2007/0047344 A1 | 3/2007 | Thayer et al. | |
| 2007/0050688 A1 | 3/2007 | Thayer | |
| 2007/0089035 A1 | 4/2007 | Alexander et al. | |
| 2007/0101094 A1 | 5/2007 | Thayer et al. | |
| 2007/0150792 A1 | 6/2007 | Ruckerbauer | |
| 2007/0192667 A1 | 8/2007 | Nieto et al. | |
| 2007/0260623 A1 | 11/2007 | Jaquette et al. | |
| 2007/0286199 A1 | 12/2007 | Coteus et al. | |
| 2008/0001043 A1 | 1/2008 | Meyer | |
| 2008/0005644 A1 | 1/2008 | Dell | |
| 2008/0010435 A1 | 1/2008 | Smith et al. | |
| 2008/0016338 A1 | 1/2008 | Sun | |
| 2008/0025027 A1 | 1/2008 | Lim et al. | |
| 2008/0046796 A1 | 2/2008 | Dell et al. | |
| 2008/0163385 A1 | 7/2008 | Mahmoud | |
| 2008/0168329 A1 | 7/2008 | Han | |
| 2008/0222449 A1 | 9/2008 | Ramgarajan et al. | |
| 2008/0250270 A1 | 10/2008 | Bennett | |
| 2008/0266999 A1 | 10/2008 | Thayer | |
| 2008/0285449 A1 | 11/2008 | Larsson et al. | |
| 2008/0313241 A1 | 12/2008 | Li et al. | |
| 2009/0000688 A1 | 1/2009 | Hopkinson et al. | |
| 2009/0000690 A1 | 1/2009 | Oldham et al. | |
| 2009/0006886 A1 | 1/2009 | O'Connor et al. | |
| 2009/0006900 A1 | 1/2009 | Lastras-Montano et al. | |
| 2009/0024902 A1 | 1/2009 | Jo et al. | |
| 2009/0049365 A1 | 2/2009 | Kim et al. | |
| 2009/0164715 A1 | 6/2009 | Astigarraga et al. | |
| 2009/0193315 A1 | 7/2009 | Gower et al. | |
| 2009/0228648 A1 | 9/2009 | Wack | |
| 2009/0287890 A1 | 11/2009 | Bolosky | |
| 2010/0005345 A1 | 1/2010 | Ferraiolo et al. | |
| 2010/0107148 A1 | 4/2010 | Decker et al. | |
| 2010/0205367 A1 | 8/2010 | Ehrlich et al. | |
| 2010/0241899 A1 | 9/2010 | Mayer et al. | |
| 2010/0293532 A1 | 11/2010 | Andrade et al. | |
| 2010/0306489 A1 | 12/2010 | Abts et al. | |
| 2011/0051854 A1 | 3/2011 | Kizer et al. | |
| 2011/0078496 A1 | 3/2011 | Jeddeloh | |
| 2011/0126079 A1 | 5/2011 | Wu et al. | |
| 2011/0173162 A1 | 7/2011 | Anderson et al. | |
| 2011/0320914 A1 | 12/2011 | Alves et al. | |

OTHER PUBLICATIONS

Chen, P. M., et al.; "RAID: High Performance, Reliable Secondary Storage"; ACM Computing Surveys; vo. 26, No. 2, p. 145-185; Jun. 1994.

D. Wortzman; "Two-Tier Error Correcting Code for Memories"; vol. 26, #10, pp. 5314-5318; Mar. 1984.

EP Application No. 08760760.2 Examination Report dated Jun. 10, 2010, 7 pages.

EP Application No. 08760760.2 Examination Report dated Jul. 23, 2012, 7 pages.

International Search Report and Written Opinion for PCT/EP2008/057199 dated Mar. 23, 2009, 10 pages.

International Search Report and Written Opinion for PCT/EP2011/058924 dated Nov. 9, 2011, 9 pages.

L.A. Lastras-Montano; "A new class of array codes for memory storage"; Version—Jan. 19, 2011, 9 pages.

System Z GF (65536) x8 Raim Code—Mar. 12, 2010, pp. 1-22.

* cited by examiner

| MARKS / NEW ERRORS | NO MARKS | SINGLE CHIP MARKED | TWO CHIPS MARKED | DIMM MARKED | SINGLE CHIP & DIMM MARKED | DOUBLE CHIP & DIMM MARKED |
|---|---|---|---|---|---|---|
| NONE | GOOD | GOOD | GOOD | GOOD | GOOD | GOOD |
| 1 CHIP/1 BIT | CE | CE | CE | CE | CE | CE |
| 1 CHIP/>1 BIT | CE | CE | CE | CE | CE | UE |
| 2 CHIPS, SAME DIMM | CE | CE | CE | UE | UE | UE |
| 2 CHIPS, DIFFERENT DIMMS | UE | UE | UE | UE | UE | UE |
| FULL DIMM ERRORS (CRC OR OTHER) | CE | CE | CE | UE | UE | UE |

FIG. 6

ERROR CORRECTION AND DETECTION IN A REDUNDANT MEMORY SYSTEM

BACKGROUND OF THE INVENTION

This invention relates generally to computer memory and more particularly, to error detection and correction in a redundant memory system.

Memory device densities have continued to grow as computer systems have become more powerful. With the increase in density comes an increased probability of encountering a memory failure during normal system operations. Techniques to detect and correct bit errors have evolved into an elaborate science over the past several decades. Perhaps the most basic detection technique is the generation of odd or even parity where the number of 1's or 0's in a data word are "exclusive or-ed" (XOR-ed) together to produce a parity bit. If there is a single error present in the data word during a read operation, it can be detected by regenerating parity from the data and then checking to see that it matches the stored (originally generated) parity.

Richard Hamming recognized that the parity technique could be extended to not only detect errors, but to also correct errors by appending an XOR field, an error correction code (ECC) field, to each data, or code, word. The ECC field is a combination of different bits in the word XOR-ed together so that some number of errors can be detected, pinpointed, and corrected. The number of errors that can be detected, pinpointed, and corrected is related to the length of the ECC field appended to the data word. ECC techniques have been used to improve availability of storage systems by correcting memory device (e.g., dynamic random access memory or "DRAM") failures so that customers do not experience data loss or data integrity issues due to failure of a memory device.

Redundant array of independent memory (RAIM) systems have been developed to improve performance and/or to increase the availability of storage systems. RAIM distributes data across several independent memory modules (each memory module contains one or more memory devices). There are many different RAIM schemes that have been developed each having different characteristics, and different pros and cons associated with them. Performance, availability, and utilization/efficiency (the percentage of the disks that actually hold customer data) are perhaps the most important. The tradeoffs associated with various schemes have to be carefully considered because improvements in one attribute can often result in reductions in another.

BRIEF SUMMARY OF THE INVENTION

An embodiment is a memory system that includes a memory controller; a plurality of memory channels in communication with the memory controller, the memory channels including a plurality of memory devices; a cyclical redundancy code (CRC) mechanism for detecting that one of the memory channels has failed, and for marking the memory channel as a failing memory channel; and an error correction code (ECC) mechanism. The ECC is configured for ignoring the marked memory channel and for detecting and correcting additional memory device failures on memory devices located on one or more of the other memory channels, thereby allowing the memory system to continue to run unimpaired in the presence of the memory channel failure.

Another embodiment is a computer implemented method that includes detecting that a memory channel has failed, the detecting in response to a CRC, the memory channel one of a plurality of memory channels in communication with a memory controller, each memory channel including one or more memory devices. The method also includes marking the memory channel as a failing memory channel; and detecting and correcting additional memory device failures on memory devices located on one or more of the other memory channels, the detecting and correcting responsive to the marking and to an ECC.

A further embodiment is a memory controller that includes an interface to a plurality of memory channels, the modules in communication with a plurality of memory devices. The memory controller also includes a CRC mechanism for detecting that one of the memory channels has failed, and for marking the memory channel as a failing memory channel; and an ECC mechanism for ignoring the marked channel and for detecting and correcting additional memory device failures on memory devices located on one or more of the other memory channels, thereby allowing the memory system to continue to run unimpaired in the presence of the memory channel failure.

BRIEF DESCRIPTION OF THE DRAWINGS

Referring now to the drawings wherein like elements are numbered alike in the several FIGURES:

FIG. 6 depicts a table of error coverage of exemplary embodiments.

DETAILED DESCRIPTION OF EXEMPLARY EMBODIMENTS

Figure 1:
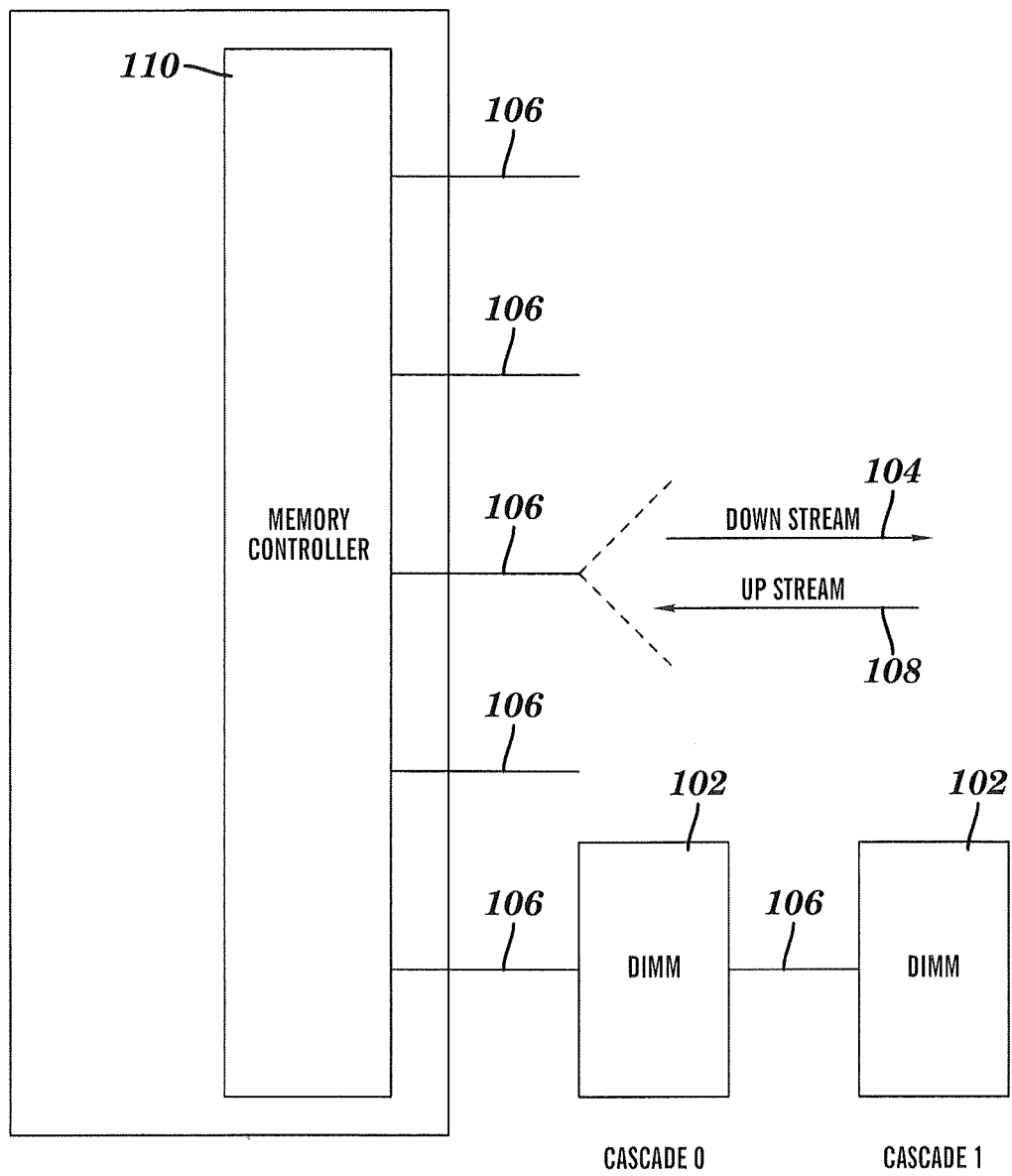
FIG. 1 is a block diagram of a cascaded interconnect memory system that may be implemented by an exemplary embodiment.

An exemplary embodiment of the present invention provides improved data protection in a redundant array of independent memory (RAIM) system by using both a cyclical redundancy code (CRC) to detect and mark failing channels and a RAIM error correction code (ECC) to detect and correct failing memory channels and devices. Using ECC by itself in an exemplary RAIM system does not allow for correction of a newly detected memory device error when there is an existing but unmarked memory device or channel failure when the new error is detected. CRC can be used for error detection in a memory system, however CRC does not perform any error correction and invokes retries when an error is detected. An exemplary embodiment uses channel CRC information to effectively improve the number of errors that can be corrected and detected in an ECC RAIM system.

As used herein, the term "memory channel" refers to a logical entity that is attached to a memory controller and which connects and communicates to registers, memory buffers and memory devices. Thus, for example, in a cascaded memory module configuration a memory channel would comprise the connection means from a memory controller to a first memory module, the connection means from the first memory module to a second memory module, and all intermediate memory buffers, etc. As used herein, the term "channel failure" refers to any event that can result in corrupted data appearing in the interface of a memory controller to the memory channel. This failure could be, for example, in a communication bus (e.g., electrical, and optical) or in a device that is used as an intermediate medium for buffering data to be conveyed from memory devices through a communication bus, such as a memory hub device. The CRC referred to herein is calculated for data retrieved from the memory chips (also referred to herein as memory devices) and checked at the memory controller. In the case that the check does not pass, it is then known that a channel failure has occurred. An exemplary embodiment described herein applies to both the settings in which a memory buffer or hub device that computes the CRC is incorporated physically in a memory module as well as to configurations in which the memory buffer or hub device is incorporated to the system outside of the memory module.

An exemplary embodiment combines the capabilities of ECC and CRC to detect and correct additional memory device failures occurring coincident with a memory channel failure. An exemplary embodiment includes a five channel RAIM that implements channel CRC to apply temporary marks to failing channels. In an exemplary embodiment, the data are stored into all five channels and the data are fetched from all five channels, with the CRC being used to check the local channel interfaces between a memory controller and cascaded memory modules. In the case of fetch data, if a CRC error is detected on the fetch (upstream), the detected CRC error is used to mark the channel with the error, thus allowing better protection/correction of the fetched data. An exemplary embodiment eliminates the retry typically required on fetches when errors are detected, and allows bad channels to be corrected on the fly without the latency cost associated with a retry. An exemplary embodiment as described herein can be used to detect and correct one failing memory channel coincident with up to two memory device failures occurring on one or two of the other memory modules (or channels).

FIG. 1 is a block diagram of a cascade interconnect memory system that may be implemented by an exemplary embodiment. The memory system depicted in FIG. 1 includes multiple independent cascade interconnected memory interface busses 106 that are logically aggregated together to operate in unison to support a single independent access request from a memory controller 110. The servicing of the single independent access request includes data and error detection/correction information distributed or "striped" across the parallel memory interface busses 106 and associated memory devices located on the memory modules 102. An embodiment also includes CRC error detection being performed on data being transferred on the memory interface busses 106 between the memory controller 110 and the memory modules 102.

As shown in the embodiment depicted in FIG. 1, the memory controller 110 attaches to five narrow/high speed point-to-point memory interface busses 106, with each memory interface bus 106 connecting one of five memory controller interface channels to a cascade interconnect memory module 102 (or memory subsystem). In an exemplary embodiment, each memory module 102 includes at least one hub device and one or more memory devices. As depicted in FIG. 1, the memory interface busses 106 operate in unison to support an access request from the memory controller 110. In an exemplary embodiment, there may exist a multiplicity of outstanding fetch and store requests to the multiple cascades in the memory subsystem.

Each memory interface bus 106 in the embodiment depicted in FIG. 1 includes an upstream bus 108 and a downstream bus 104. One of the functions provided by the memory modules 102 (e.g., a hub device located on the memory module 102) is a re-drive function to send signals on the upstream bus 108 to the memory controller 110 or on the downstream bus 104 to other memory modules 102. In an exemplary embodiment, up to two memory modules 102 are cascade connected to each memory interface bus 106. In an exemplary embodiment, the memory interface bus 106 is implemented using differential clock and data signals (i.e., each clock and data signal requires two wires). In an exemplary embodiment, the downstream bus 104 includes thirty-two wires to support: one clock signal, thirteen data/command signals (or bits), one spare clock lane, and one spare data/command lane. In this embodiment, each data packet is transferred over the downstream bus 104 in twelve beats and includes eighteen CRC bits. In an exemplary embodiment, the upstream bus 108 includes forty-six wires to support: one clock signal, twenty data/command signals, one spare clock lane, and one spare data/command lane. In this embodiment, each data packet is transferred over the upstream bus 108 in eight beats and includes sixteen CRC bits.

As used herein, the term "RAIM" refers to redundant arrays of independent memory modules (e.g., dual in-line memory modules or "DIMMs). In a RAIM system, if one of the memory channels fails (e.g, a memory module in the channel), the redundancy allows the memory system to use data from one or more of the other memory channels to reconstruct the data stored on the memory module(s) in the failing channel. The reconstruction is also referred to as error correction. As used herein, the terns "RAIM" and "redundant arrays of independent disk" or "RAID" are used interchangeably.

In an exemplary embodiment, the memory system depicted in FIG. 1 is a RAIM memory system and the five channels are lock step channels (i.e., the five memory interface busses 106 are accessed in unison with each other). In an exemplary embodiment, the RAIM system depicted in FIG. 1 is implemented using a RAIM ECC code such as that described in commonly assigned U.S. patent application Ser No. 12/822, 469, entitled "Error Correction and Detection in a Redundant Memory System" filed on Jun. 24, 2010, which is incorporated by reference herein in its entirety. The RAIM ECC in this implementation has the property that one of the channel's data is the bitwise XOR of the other four channel's data. Additional checks are included in order to correct for additional errors. A summary of the properties of the code can be found in the table in FIG. 6, described herein below. As used herein, the term "mark" refers to is an indication given to an ECC that a particular symbol or set of symbols of a read word are suspected to be faulty. The ECC can then use this information to enhance it's error correction properties.

As it can be seen from the table in FIG. 6, when a channel mark is placed, the RAIM ECC can correct at least one unknown bit error (and sometimes an entire unknown chip error), depending on how many additional chip marks (suspected chip errors) are in place. However, without a channel mark, a pattern with a channel error and a single bit error in another channel will cause an uncorrectable error. In accordance with an exemplary embodiment, if the error is caught by the channel CRC, then a temporary mark can be placed which will allow the RAIM ECC to correct additional possible errors. Memory channel failure may require replacement, but the integrity of the concurrently accessed data is not destroyed (i.e., the error is a correctable error or a "CE") by the failure of a single memory channel. Upon memory channel failure, any subsequent reads are calculated from the distributed parity such that the memory channel failure is masked from the end user (i.e., the marked memory channel is ignored).

As used herein, the term "correctable error" or "CE" refers to an error that can be corrected while the system is operational, and thus a CE does not cause a system outage. As used herein, the term "uncorrectable error" or "UE" refers to an error that cannot be corrected while the memory system is operational, and thus correction of a UE causes the memory system to be off-line for some period of time while the cause of the UE is being corrected (e.g., by replacing a memory device, by replacing a memory module, recalibrating an interface).

As used herein, the term "coincident" refers to the occurrence of two (or more) error patterns or error conditions that overlap each other in time. In one example, a CE occurs and then later in time, before the first CE can be repaired, a second failure occurs. The first and second failure are said to be coincident. Repair times are always greater than zero and the longer the repair time, the more likely it would be to have a second failure occur coincident with the first. Some contemporary systems attempt to handle multiple failing devices by requiring sparing a first device or module. This may require substantially longer repair times than simply using marking, as provided by exemplary embodiments described herein. Before a second failure is identified, exemplary embodiments provide for immediate correction of a memory channel failure using marking, thus allowing an additional correction of a second failure. Once a memory channel failure is identified, an exemplary embodiment provides correction of the memory channel failure, up to two marked additional memory devices and a new single bit error. If the system has at most one marked memory device together with the marked channel, then an entire new chip error can be corrected. The words "memory channel failure" utilized herein, includes failures of the communication medium that conveys the data from the memory modules 102 to the memory controller 110 (i.e., a memory interface bus 106), in addition to possible memory hub devices and registers.

Figure 2:
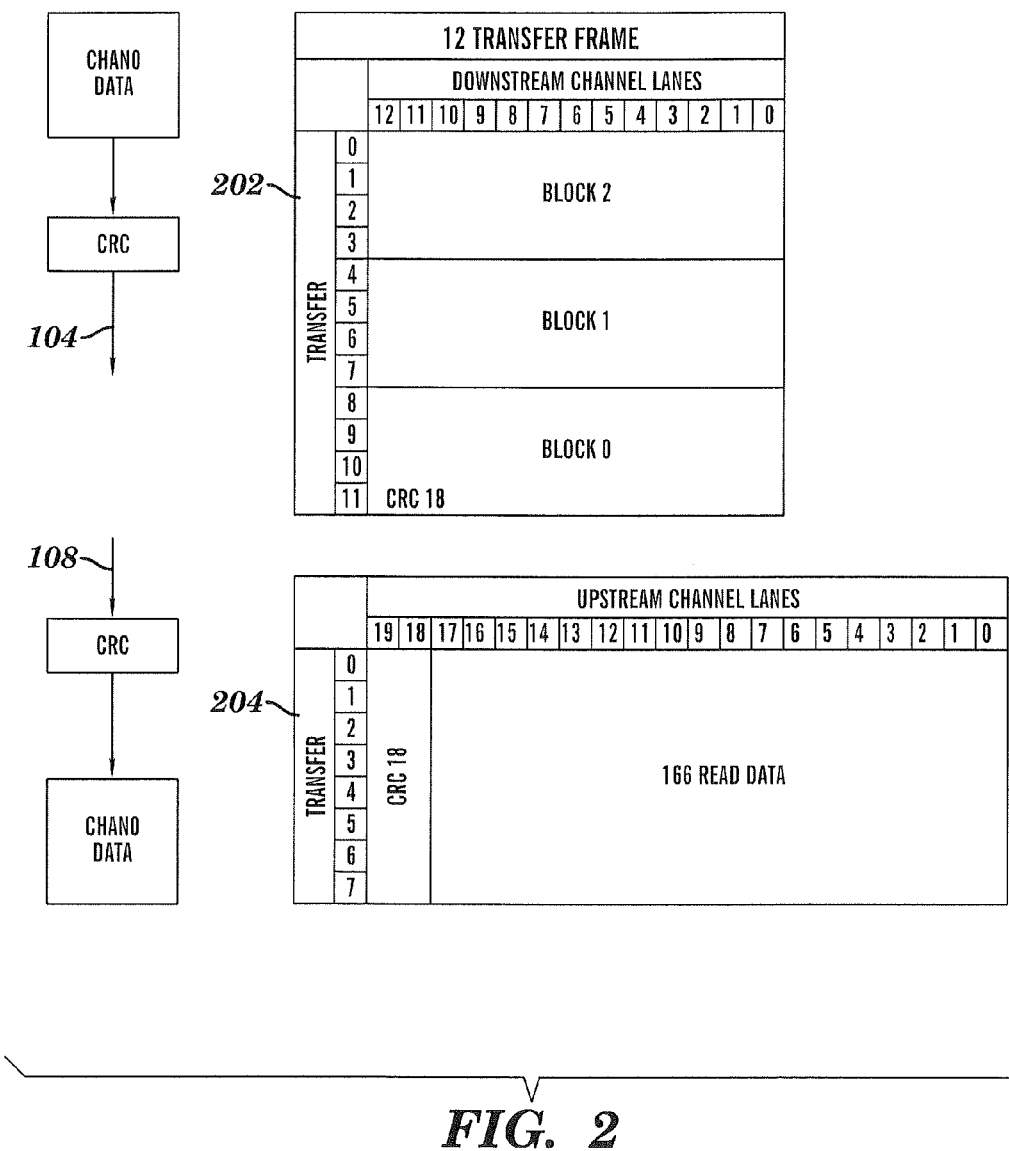
FIG. 2 depicts packet configurations with bus cyclical redundancy code (CRC) protection that may be implemented as an exemplary embodiment.

FIG. 2 depicts packet configurations that may be implemented in an exemplary embodiment. An exemplary downstream frame 202 sent (e.g., from the memory controller 110) via the downstream bus 104 is depicted in FIG. 2. The downstream frame 202 includes 138 bits of data and 18 bits of CRC generated in twelve beat packets. Other frame sizes, CRC and data bit placements, and number of beats per frame may be implemented by exemplary embodiments. For example, the CRC bits may be located in a different block within the downstream frame 202, have different placement within a block and/or span more than one block in the downstream framed 202. An exemplary upstream frame 204 received from a memory module 102 via the upstream bus 108 is depicted in FIG. 2 and includes 144 bits of data and 16 CRC bits generated in eight beat packets. Each upstream frame 204 is made up of eighteen bytes of read data. Ninety bytes in total are read in parallel, with each memory module 102 providing eighteen bytes of read data. Other frame sizes, CRC and data bit placements, and number of beats per frame may be implemented by exemplary embodiments.

Figure 3:
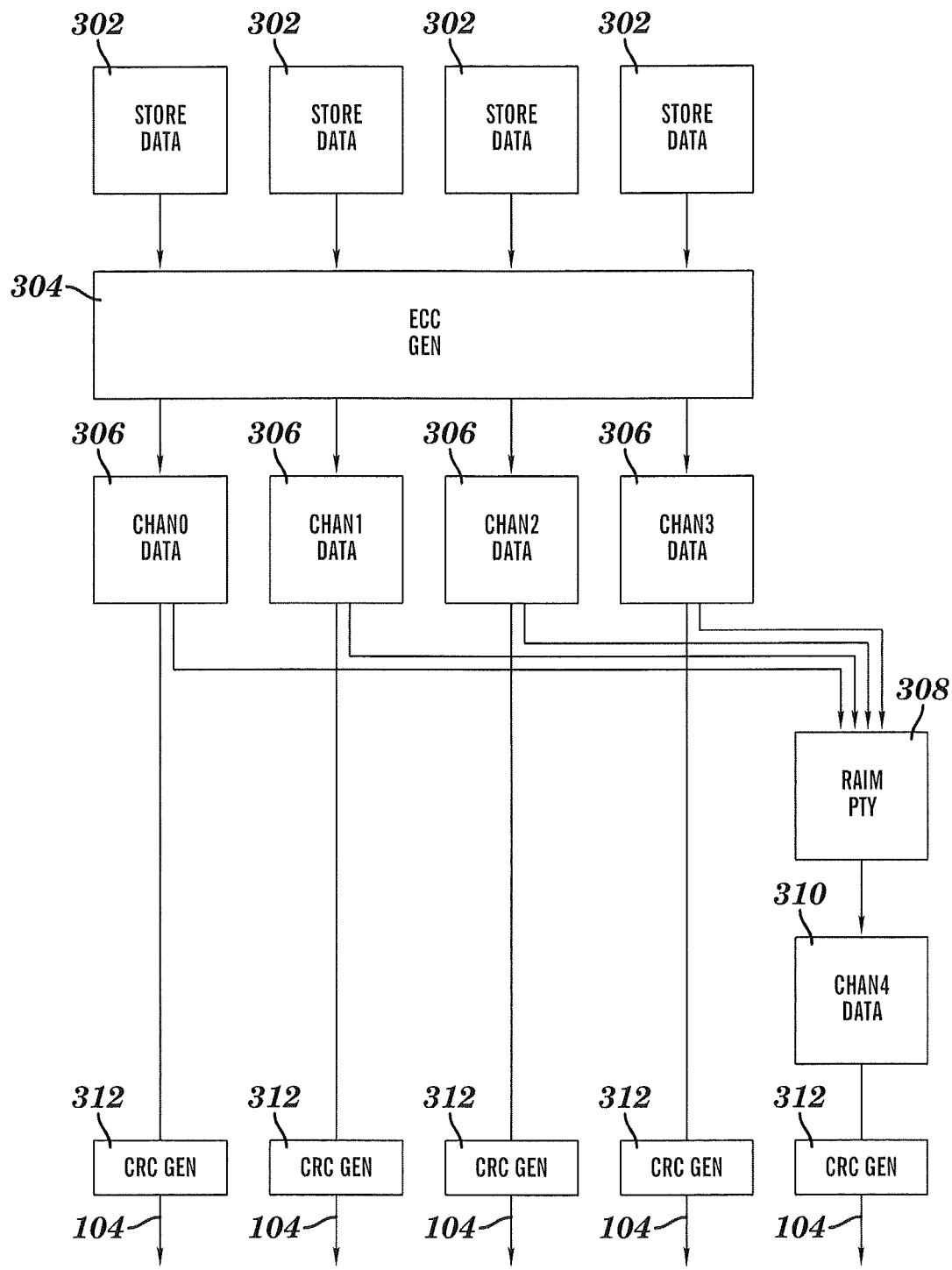
FIG. 3 is a block diagram of a redundant array of a independent memory (RAIM) store path that implements both error correction code (ECC) and channel CRC that may be implemented by an exemplary embodiment.

FIG. 3 is a block diagram of a RAIM store path that implements a combination of ECC and channel CRC that may be implemented by an exemplary embodiment. In an exemplary embodiment, the store path is implemented by hardware and/or software located on the memory controller 110. In addition, the store path may be implemented by hardware and/or software instructions located on a memory module 102 (e.g., in a hub device on the memory module). The RAIM configuration depicted in FIG. 3, which includes a memory channel that is dedicated to storing parity information, has some similarities to a RAID 3 configuration (i.e., striped disks with dedicated parity), although as described earlier in reference to FIG. 1, a RAIM ECC code may be implemetned that includes additional checks that are stored that allow for functionality well beyond the RAID 3 capabilities. As depicted in FIG. 3, data from the five channels are combined in a way that protects data against loss of any one memory channel (e.g., a memory module 102).

In the RAIM store path depicted in FIG. 3, the ECC generator 304 receives store data 302 and outputs four groupings of channel data 306 that include ECC checkbits. The channel data 306 are input to individual CRC generators 312 and are also input to a RAIM parity generator 308 that outputs RAIM parity bits as channel data 310. The combination of the ECC checkbits and the RAIM parity bits described above are the overall checkbits of the RAIM ECC. The channel data 306 310 are input to the CRC generators 312 to generate CRC bits for the channel data 306 310. Output from the CRC generators 312 (including CRC and data bits) are then output to the downstream bus 104 (or channel) for transmission to the memory modules 102. As shown in FIG. 3, the data being stored on the memory modules 102 are supplemented by both ECC and CRC bits. In an exemplary embodiment, the output from each of the CRC generators 312 is formatted as a downstream frame 202 such as the one depicted in FIG. 2.

Figure 4:
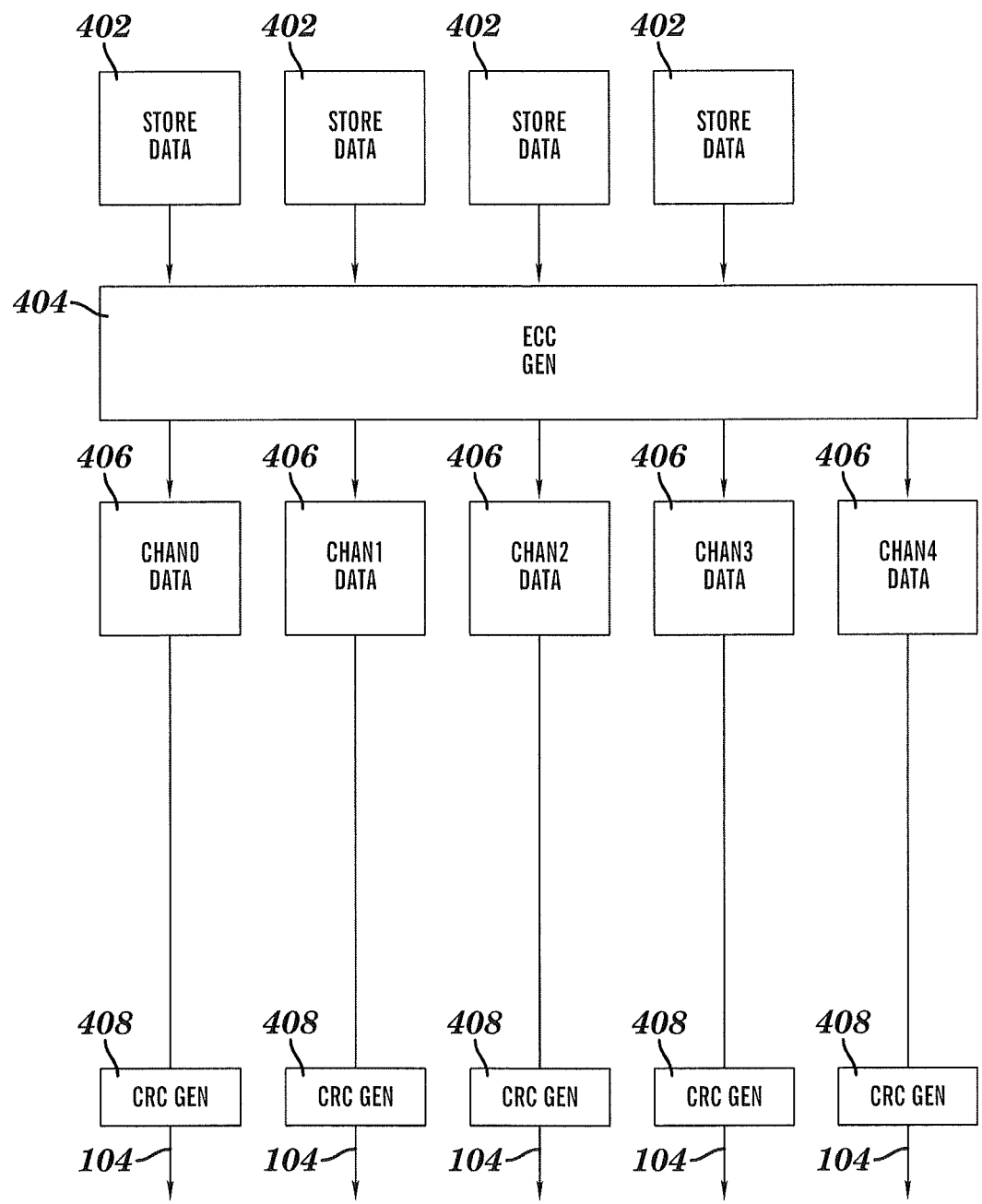
FIG. 4 is a block diagram of a RAIM store path that implements both ECC and channel CRC that may be implemented by an exemplary embodiment.

FIG. 4 is a block diagram of a RAIM store path that implements a combination of ECC and channel CRC that may be implemented by an exemplary embodiment. In an exemplary embodiment, the store path is implemented by hardware and/or software located on the memory controller 110. In addition, the store path may be implemented by hardware and/or software instructions located on a memory module 102 (e.g., in a hub device on the memory module). The RAIM configuration depicted in FIG. 4, is a derivative of a RAID 3 configuration except that there are additional checks stored on each channel computed when the RAIM ECC code described above with reference to FIG. 1 is implemented. As depicted in FIG. 4, data from the five channels are combined in a way that protects data against loss of any one memory channel.

In the RAIM store path depicted in FIG. 4, the ECC generator 404 receives store data 402 and outputs five groupings of channel data 406 that include ECC checkbits. The channel data 406 are input to individual CRC generators 408 to generate CRC bits for the channel data 406. Output from the CRC generators 408 (including CRC and data and ECC bits) are then output to the downstream bus 104 (or channel) for transmission to the memory modules 102. As shown in FIG. 4, the data being stored on the memory modules 102 are supplemented by both ECC and CRC bits. In an exemplary embodiment, the output from each of the CRC generators 408 is formatted as a downstream frame 202 such as the one depicted in FIG. 2.

Figure 5:
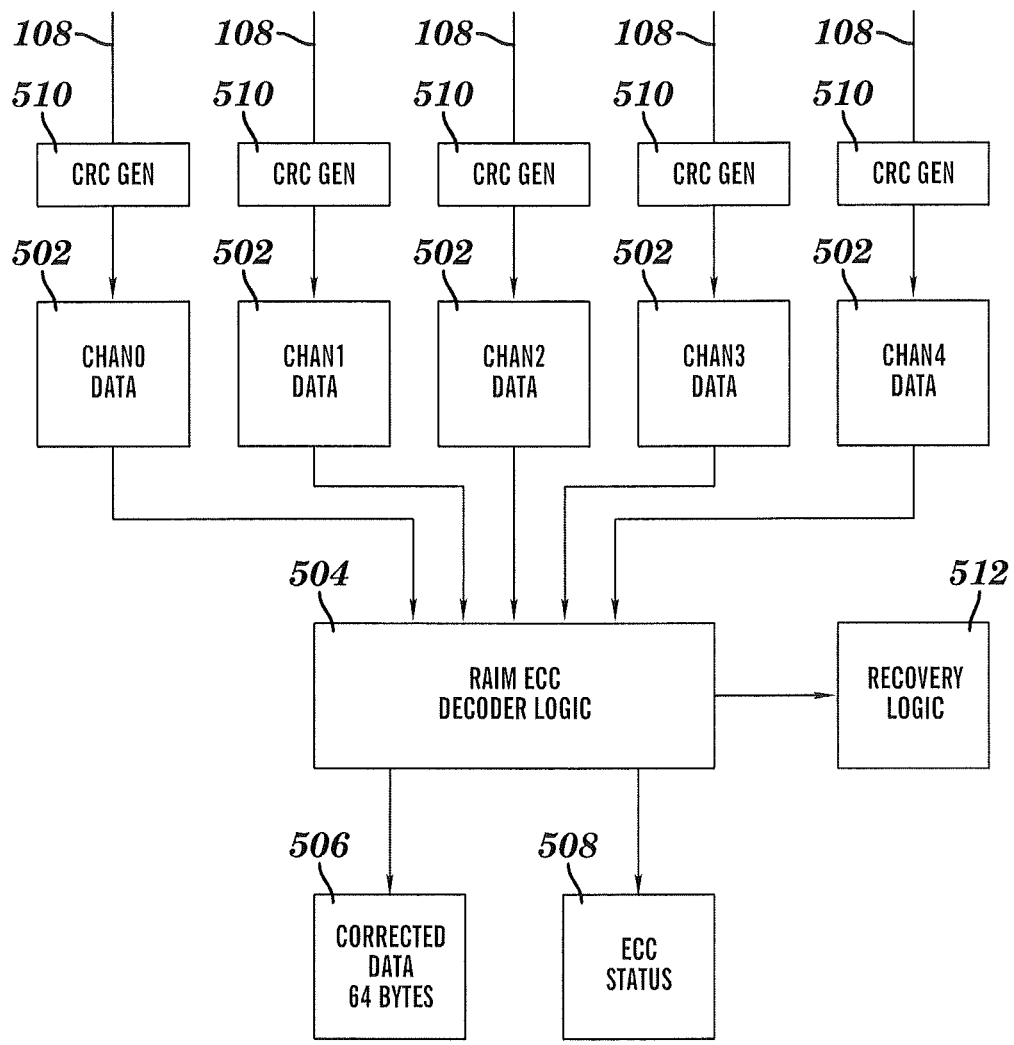
FIG. 5 is a block diagram of a RAIM fetch path that implements both ECC and channel CRC that may be implemented by an exemplary embodiment.

FIG. 5 is a block diagram of a RAIM fetch path that implements both ECC and channel CRC that may be implemented by an exemplary embodiment. In an exemplary embodiment, the fetch path is implemented by hardware and/or software located on the memory controller 110. In addition, the fetch path may be implemented by hardware and/or software instructions located on a memory module 102 (e.g., in a hub device on the memory module). As shown in FIG. 5, the RAIM fetch path includes receiving data on the upstream bus 108. In an exemplary embodiment, the data received on the upstream bus 108 is an upstream frame 204 such as the one depicted in FIG. 2. The CRC checker 510 depicted in FIG. 5 is utilized to detect a channel error, and to temporarily mark a failing channel.

Output from the CRC checkers 510 are the channel data 502 that include data and ECC bits that were generated by an ECC generator, such as ECC generator 404 depicted in FIG. 4. The channel data 502 are input to RAIM ECC decoder logic 504 where channel data 502 are analyzed for errors which may be detected and corrected using the RAIM ECC and the temporary CRC marking on a failing channel (if a failing channel is detected by any of the CRC checkers 510). Output from the RAIM ECC decoder logic 504 are the corrected data 506 (in this example 64 bytes of corrected data) and an ECC status 508. If CRC errors were detected by CRC checkers 510, then recovery logic 512 is invoked to recover any outstanding stores and to repair any downstream bus 104 and upstream bus 108 lanes. In an exemplary embodiment, the recovery logic 512 performs a retry of stores and/or fetches where errors have been identified. Exemplary embodiments provide the ability to have soft errors present (e.g., failing memory devices) and also channel failures or other internal errors without getting UEs.

FIG. 6 depicts a table of error coverage of exemplary embodiments Notice that, in the absence of any channel marks, all single or multiple bit chip errors isolated to a single channel are always 100% correctable, whether there are single or double DRAM chip marks. However, if a single channel error occurs and another channel has an error (for example a single bit or single chip error), the error is normally deemed UE. However, an exemplary embodiment of the invention will treat a CRC error in a single channel as a temporary channel mark, thus allowing the second bit or chip to be fully correctable. For example, an exemplary embodiment has interface logic that allows for scrambling and descrambling logic such as that shown in United States Patent Publication Number US20060193395A1, titled "Combined Alignment Scrambler Function for Elastic Interface". If there is a clock error in one channel and a DRAM error in another channel, this would normally cause data from two or more DRAMs in different channels to be in error. This error condition would be a UE as depicted by the table in FIG. 6 (no marks and 2 chips, different DIMMs) in the $5^{th}$ row and first column of the table in FIG. 6. However, the clock error would also cause CRC errors (because of the said scrambler function) and would cause a channel mark for the channel which had a clock error. Therefore, an exemplary embodiment would yield a CE (DIMM Marked and 1 Chip) for the case of a clock error in one channel and a DRAM error in another channel as depicted in the $2^{nd}$ and $3^{rd}$ rows and $4^{th}$ column of the table in FIG. 6.

Exemplary embodiments also provide CRC detection and isolation to channel interfaces. When CRC errors are detected on a channel, the bad channel is temporarily marked to help protect against channel errors. This marking allows the ECC to better correct against other errors. For example, a new chip error may be present in the data fetched in a channel other than the one with a CRC error and if up to one chip mark is placed, then this new chip error is fully correctable. This means that fetch data can continue to be fetched while getting corrected back to the system, even in light of a bad channel.

Even without the presence of CRC errors, the RAIM ECC code can correct channel and chip failures. For instance, assume that there were several bad stores to memory within the DRAMs. When this data is fetched, good CRC gets generated, so CRC errors will not be present. However, the ECC will detect and correct single channel errors, even if the errors are in the DRAMs themselves.

The RAIM ECC code supports incorporating a special uncorrectable error (SPUE) signature into an encoded data packet so that in the absence of new errors, and irrespective of the chip and channel marking state and the errors in the marked chips/channel, the SPUE is still detectable as a SPUE. Even if there are a large number of errors on top of the codeword, the data will still be flagged as a UE. This is necessary to protect against UE data that has to be stored to memory to keep soft errors from having that data appear good (i.e. Clean or CE).

Technical effects and benefits include the ability to run a memory system in an unimpaired state in the presence of a memory channel failure occurring coincident with up to two additional memory device failures. This may lead to significant improvements in memory system availability and serviceability.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A memory system comprising:
    a memory controller;
    a plurality of memory channels in communication with the memory controller, the memory channels comprising a plurality of memory devices;
    a cyclical redundancy code (CRC) mechanism for detecting that one of the memory channels has failed, and for marking the memory channel as a failing memory channel; and
    an error correction code (ECC) mechanism for ignoring the marked memory channel and for detecting and correcting up to two additional memory device failures on memory devices located on one or more of the other memory channels, thereby allowing the memory system to continue to run unimpaired in the presence of the memory channel failure and the up to two additional memory device failures.

2. The memory system of claim 1, wherein the marking is a temporary marking that is removed by the ECC mechanism after the detecting and correcting are completed.

3. The memory system of claim 1, further comprising a retry mechanism for removing the marking of the memory channel and for retrying a memory operation.

4. The memory system of claim 1, wherein at least one of the up to two additional memory device failures are coincident with the failing memory channel.

5. The memory system of claim 1, wherein two of the up to two additional memory device failures are coincident with the failing memory channel.

6. The memory system of claim 1, wherein the ECC mechanism implements a redundant arrays of independent disk three (RAID 3) ECC.

7. The memory system of claim 1, wherein the ECC mechanism implements a redundant arrays of independent disk four (RAID 4) ECC.

8. A computer implemented method comprising:
   detecting that a memory channel has failed, the detecting in response to a cyclical redundancy code (CRC), the memory channel one of a plurality of memory channels in communication with a memory controller, each memory channel comprising one or more memory devices;
   marking the memory channel as a failing memory channel; and
   detecting and correcting up to two additional memory device failures on memory devices located on or more of the other memory channels, the detecting and correcting responsive to the marking and to an error correction code (ECC).

9. The method of claim 8, wherein the marking is a temporary marking and the method further comprises removing the marking after the detecting and correcting are completed.

10. The method of claim 8, further comprising:
    removing the marking of the memory channel; and
    retrying a memory operation.

11. The method of claim 8, wherein at least one of the up to two additional memory device failures are coincident with the failing memory channel.

12. The method of claim 8, wherein two of the up to two additional memory device failures are coincident with the failing memory channel.

13. The method of claim 8, wherein the ECC is a redundant arrays of independent disk three (RAID 3) ECC.

14. The method of claim 8, wherein the ECC is a redundant arrays of independent disk four (RAID 4) ECC.

15. A memory controller comprising:
   an interface to a plurality of memory channels, the modules in communication with a plurality of memory devices; and
   a cyclical redundancy code (CRC) mechanism for detecting that one of the memory channels has failed, and for marking the memory channel as a failing memory channel; and
   an error correction code (ECC) mechanism for ignoring the marked memory channel and for detecting and correcting up to two additional memory device failures on memory devices located on one or more of the other memory channels, thereby allowing the memory system to continue to run unimpaired in the presence of the memory channel failure and the up to two memory device failures.

16. The memory controller of claim 15, wherein the marking is a temporary marking that is removed by the ECC mechanism after the detecting and correcting are completed.

17. The memory controller of claim 15, further comprising a retry mechanism for removing the marking of the memory channel and for retrying a memory operation.

18. The memory controller of claim 15, wherein at least one of the up to two additional memory device failures are coincident with the failing memory channel.

19. The memory controller of claim 15, wherein two of the up to two additional memory device failures are coincident with the failing memory channel.

20. The memory controller of claim 15, wherein the ECC mechanism implements a redundant arrays of independent disk three (RAID 3) ECC or a redundant arrays of independent disk four (RAID 4) ECC.

* * * * *